Figure 1:
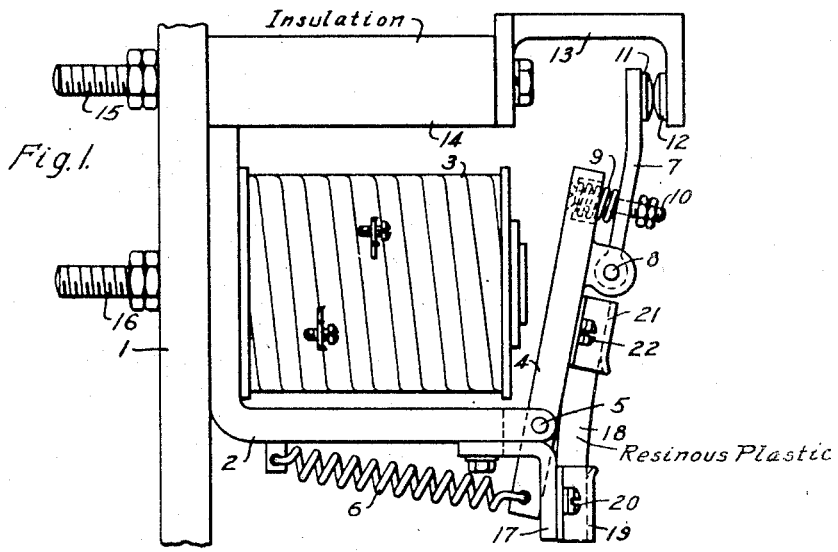

Aug. 19, 1947.  W. R. TALIAFERRO  2,426,068
SHOCKPROOF DEVICE
Filed March 18, 1944

WITNESSES:

INVENTOR
William R. Taliaferro.
BY
Paul E. Friedemann
ATTORNEY

Patented Aug. 19, 1947

2,426,068

UNITED STATES PATENT OFFICE 2,426,068

SHOCKPROOF DEVICE

William R. Taliaferro, Edgewood, Pa., assignor to Westinghouse Electric Corporation, East Pittsburgh, Pa., a corporation of Pennsylvania Application March 18, 1944, Serial No. 527,117

3 Claims. (Cl. 200—87)

My invention relates to mechanical and electrical equipment in which movable parts are provided with protective means for preventing these parts from uncontrolled movements when subjected to impact, shock or vibration.

For instance, with electric contactors on board of war vessels or vehicles, it is important that no electric circuits are interrupted or closed due to the occurrence of impact vibrations. In other words, the contact elements of such a contactor must remain in engagement or disengagement during an impact depending upon what position they held immediately previous to the impact.

One way of designing apparatus of such type is to render the movable parts statically and dynamically balanced relative to a pivot axis about which these parts are rotatable relative to the stationary support. However, such a design is not always feasible or practical because it leads often to intricate and expensive constructions. Another way of obtaining shockproof devices is to provide them with inertia responsive control means which perform vibrations relative to their support when shock is applied to the equipment. These control means actuate a stop or latch which enters into the path of the movable part and prevents its motion during the persistence of shock forces. Devices of this type or likewise complicated and space-consuming for many cases of application and have the disadvantage that the shock-responsive latch means prevent also the intended and properly controlled operation as long as the shock forces persist.

It is an object of my invention to provide equipment and apparatus with shock protective means which do not require a statically and dynamically balanced construction of the movable parts and are simpler and less space-consuming than the known inertia controlled latching devices.

More particularly, it is an object of the invention to devise shockproofing means for electric contactors which are readily applicable with clapper type armatures and are of so little compass as to require virtually no space in addition to that usually available within the enclosure of customary contactors.

Still another object of my invention is the provision of shockproof devices, especially electric contactors, which, while prevented from uncontrolled operation when under shock, permit, nevertheless, an intended controlled operation during the period of persistence of shock forces.

In order to achieve these objects, my invention takes advantage of the property of cold-flowing plastic materials to offer great resistance to deforming stresses of short duration or relatively high frequency, while offering a much lower resistance to steady unidirectional deforming stresses. For instance when a body of cold-flowing material, in accordance with my invention, is chosen as to composition and dimensions that it will yield sufficiently to a deforming stress caused by the forces available in apparatus for actuating its movable member, the same body will behave as if it were rigid when a sudden blow is applied thereto, or when a number of blows are applied in quick succession or quickly alternating directions.

In order to utilize such bodies for the shockproofing of apparatus and equipment, the body is associated with the movable part to be protected from uncontrolled shock-responsibe motion so that it is subjected to cold-flow deformation when the normal control force, for instance the attractive force of an electromagnet or the biasing force of a return spring is applied to the movable part. Then, a high-frequency stress as occurring under impact will meet with the great high-frequency resistance of the material and hence not be able to produce an appreciable motion. To this end, the plastic body is so arranged that it forms a yielding hinge or pivot of the movable part, or it is otherwise introduced into the path of motion of the movable part. Thermoplastic resins and compositions thereof are, as a rule, especially applicable for the just-mentioned purpose. However, resinous thermosetting materials can also be used, provided they are in a relatively low state of polymerization or contain plasticizers or modifiers in a sufficient amount and of proper selection to secure the necessary cold-flow deformation under the stress normally produced by the operation of the electromagnetic or other control actuating device of the apparatus. The stress imposed on the plastic material during the normal, i. e. controlled operation of the apparatus may act in compression or expansion of the material, or impose a torsional or bending strain thereon. The shape of the material may be chosen according to the requirements of each intended application and may represent a spiral, helix, diaphragm, rod, or bar, for instance.

A large number of applicable substances are known and available. Suitable resins for this application are vinyl chloride resins, polystyrene, copolymers of vinyl acetate and vinyl chloride, methyl methacrylate, cellulose acetate, linear superpolyamides, and copolymers of styrene and glycol-maleate esters.

Figure 2:
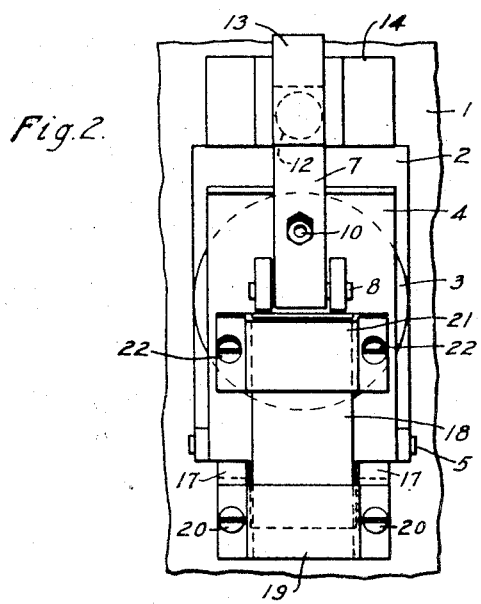

The invention will be more fully understood from the following description of the embodiment illustrated in the drawing in which Figure 1 shows a side elevation and Figure 2 a top view of a shade-protected electromagnetic relay.

According to the drawing, a rigid support 1 carries the magnetizable frame structure 2 of an electromagnet whose core is provided with a control coil 3. An armature 4 is pivoted at 5 to the frame structure 2. A helical spring 6, extending between frame structure 2 and armature 4, serves to bias the armature toward the illustrated unattracted position. A movable contact member 7 is pivoted at 8 to the armature 4 and is biased by a helical compression spring 9 toward a rigid stop 10 mounted on the armature. The spring 9 secures the necessary contact pressure and is so rated as to be compressed by the force of spring 6 when the electromagnet is deenergized, as is represented in the illustration. A contact 11 is mounted on the peripheral end of member 7 for engagement with a stationary contact 12. Contact 12 is carried by a rigid member 13 which is firmly secured to an insulating carrier 14 by means of a bolt 15, the latter serving also as a terminal for connecting the contact 12 to a lead of the circuit to be controlled. Another bolt 16 is connected by a flexible cable (not illustrated) with the movable member 7 and its contact 11, also for connection with a lead of the circuit controlled by the relay.

An angular bracket 17 is rigidly mounted on the frame structure 2 of the electromagnet. The above-mentioned body of cold-flowing plastic material is denoted by 18. It has prismatic shape and is at one end firmly attached to the bracket 17 by means of a sleeve 19 secured to the bracket 17 by means of screws 20. The other end of body 18 is firmly attached to the armature 4 by means of a sleeve 21 and appertaining screws 22. As mentioned in the foregoing, the composition of bar 18 is selected relative to its dimensions so that it offers little resistance to the bending stress applied thereto when the armature 4 is attracted by the magnet, or when the armature upon deenergization of the magnet, is returned to the illustrated position by the biasing force of spring 6. Consequently, the energization of coil 3 has the effect of separating the contacts 11 and 12, while a sudden shock force acting in the opening direction of the contacts has to put up with a relatively great resistance of the plastic body 18 and hence does not cause an interruption of the contact engagement at 11 and 12. Similarly, once the armature has been moved against the core of the electromagnet, a shock force in the contact closing direction remains ineffective due to the great resistance of body 18 against high frequency or short lasting strain.

The presence of the plastic body 18 tends to introduce a timing feature which, if desired, may also be taken advantage of in accordance with my copending application Serial No. 527,116, for Timing devices, filed March 18, 1944, now Patent No. 2,397,219. However, the present invention, i. e. the above-described principle of shockproofing, can also be applied without incurring an appreciable timing or delay effect as regards the intended control operation. The illustrated embodiment, for instance, is so designed that the delay caused by the body 18 between the beginning of the magnet energization and the opening of contacts of element 12 is a minimum and negligible for the intended control purpose. This is due to the fact that in this construction a rather limited bending deformation of the body 18 suffices to open the contact. Furthermore, the composition and dimensions of the body 18 are so selected that the resistance to bending under a continuous force is rather low and hence the timing effect likewise rather slight.

It will be recognized from the illustrated embodiment that the relay remains operative during periods of persistence of shock motion because the steady attraction of the armature by the magnet or by the return spring is not prevented from being effective during such periods. The space required by the plastic body 18 is extremely small and, as a rule, does not exceed the overall dimensions of a similar relay without such a body. It will also be recognized that the construction necessary for accommodating the plastic body is of extremely simple and inexpensive design.

In view of the fact that shockproof devices and shockproofing means according to the invention can be modified in various respects by those skilled in the art without departing from the principles, objects, advantages and essential features of the invention, I wish this specification to be understood as illustrative rather than in a limiting sense.

I claim as my invention:

1. In combination, a supporting structure; a circuit interrupting device disposed on said structure and having a stationary contact, a movable contact engageable with said stationary contact, and a substantially rigid member movable between two positions relative to said structure for controlling the movement of said movable contact, said member being biased toward one of said positions; electric actuating means mounted on said structure for moving said member into said other position, and shockproofing means having a body of cold-flowing plastic material secured at one end to said structure and at the other end to said member so as to be subjected to cold-flow deformation when said member is moved from either to the other position thereby preventing said member from changing its position due to the application of shock to said structure while permitting said member to be moved by said actuating means.

2. In combination, a supporting structure including an electromagnet, an armature pivoted to said structure for angular motion between two positions relative to said structure and being movable by said magnet toward one of said positions, a spring attached between said structure and said armature for biasing said armature toward said other position, and a body of a cold-flowing resinous plastic secured between said structure and said armature for impeding under cold-flow deformation the motion of said armature from one to the other of said positions thereby preventing said armature from leaving said one position due to the application of shock to said structure while permitting said armature to be moved by said magnet and spring.

3. In combination, a supporting structure; a circuit interrupting device disposed on said structure and having a stationary contact, a movable contact engageable with said stationary contact, and a substantially rigid member movable between two positions relative to said structure for controlling the movement of said movable contact; actuating means disposed on said structure for moving said member; and a body of a cold-flowing resinous plastic secured between said structure and said member so as to impede under cold-flow deformation the motion of said member from one to the other of said positions thereby preventing said member from leaving said one position due to the application of shock to said structure while permitting said member to be moved by said actuating means.

WILLIAM R. TALIAFERRO.

REFERENCES CITED

The following references are of record in the file of this patent:

UNITED STATES PATENTS

| Number | Name | Date |
| --- | --- | --- |
| 1,462,585 | Soreng | July 24, 1923 |
| 1,708,014 | Geisslinger | Apr. 9, 1929 |
| 1,867,099 | Roe | July 12, 1932 |
| 2,323,286 | Ward | June 29, 1943 |
| 1,822,841 | Donle | Sept. 8, 1931 |
| 2,241,837 | Williams et al. | May 13, 1941 |
| 2,282,865 | Goff | May 12, 1942 |